United States Patent
Anderson et al.

(10) Patent No.: US 10,705,669 B2
(45) Date of Patent: Jul. 7, 2020

(54) ACTIVE IMPRESSION TRACKING

(71) Applicant: Comcast Cable Communications, LLC, Philadelphia, PA (US)

(72) Inventors: Nathan Anderson, Philadelphia, PA (US); David P. Hodgman, Berwyn, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 26 days.

(21) Appl. No.: 13/833,219

(22) Filed: Mar. 15, 2013

(65) Prior Publication Data

US 2014/0282117 A1 Sep. 18, 2014

(51) Int. Cl.
*G06F 3/0481* (2013.01)
*G06Q 30/02* (2012.01)
*G06F 16/24* (2019.01)

(52) U.S. Cl.
CPC ............ *G06F 3/0481* (2013.01); *G06F 16/24* (2019.01); *G06Q 30/0242* (2013.01); *G06Q 30/0251* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,393,407 B1 * | 5/2002 | Middleton et al. | | 705/14.73 |
| 7,047,294 B2 * | 5/2006 | Johnson et al. | | 709/224 |
| 7,962,604 B1 * | 6/2011 | Morris | | G06Q 30/02 705/14.4 |
| 8,473,350 B1 * | 6/2013 | Bouret | | G06Q 30/00 705/14.66 |
| 8,682,895 B1 * | 3/2014 | Goel | | G06F 17/30705 707/732 |
| 8,799,814 B1 * | 8/2014 | Bryc et al. | | 715/811 |
| 2002/0198979 A1 * | 12/2002 | Yu | | 709/224 |
| 2004/0103426 A1 * | 5/2004 | Ludvig et al. | | 725/9 |
| 2006/0135232 A1 * | 6/2006 | Willis | | A63F 13/12 463/1 |
| 2006/0274674 A1 * | 12/2006 | Okita | | H04L 41/0806 370/254 |
| 2007/0052667 A1 * | 3/2007 | Zhou | | G09G 3/344 345/107 |
| 2007/0079243 A1 * | 4/2007 | Leigh | | G06F 11/323 715/736 |
| 2008/0154797 A1 * | 6/2008 | Choul won | | G06Q 30/0283 705/400 |
| 2009/0070190 A1 * | 3/2009 | Gorty | | G06Q 30/02 705/14.6 |
| 2009/0099939 A1 * | 4/2009 | Thakur | | G06Q 30/08 705/26.3 |
| 2009/0248665 A1 * | 10/2009 | Garg | | G06F 17/30654 |
| 2010/0036733 A1 * | 2/2010 | Chan et al. | | 705/14.54 |

(Continued)

*Primary Examiner* — Toan H Vu
(74) *Attorney, Agent, or Firm* — Ballard Spahr LLP

(57) ABSTRACT

Aspects of the disclosure relate to tracking user engagement with an interface. In one aspect, interaction of a user with a user interface can be detected and, in response to such interaction, it can be determined if the user interface was updated. In a scenario in which it is determined that the user interface was updated, an impression metric indicative of engagement of the user with the user interface can be updated. The updated metric can permit the tracking of user engagement.

20 Claims, 5 Drawing Sheets

(56) References Cited

U.S. PATENT DOCUMENTS

| | | | | |
|---|---|---|---|---|
| 2010/0057558 | A1* | 3/2010 | Yano | G06K 9/325 705/14.45 |
| 2010/0058202 | A1* | 3/2010 | Rostom | 715/758 |
| 2010/0064234 | A1* | 3/2010 | Schreiber et al. | 715/760 |
| 2010/0324988 | A1* | 12/2010 | Schaar | G06Q 30/02 705/14.42 |
| 2010/0324989 | A1* | 12/2010 | Etchegoyen | G06Q 30/0246 705/14.45 |
| 2011/0185298 | A1* | 7/2011 | Skatter et al. | 715/765 |
| 2011/0238472 | A1* | 9/2011 | Sunkada | G06Q 30/0222 705/14.23 |
| 2011/0307329 | A1* | 12/2011 | Krassner et al. | 705/14.45 |
| 2012/0042252 | A1* | 2/2012 | Neerudu | G06F 9/4445 715/733 |
| 2012/0209725 | A1* | 8/2012 | Bellinger | G06Q 30/0225 705/14.73 |
| 2012/0215627 | A1* | 8/2012 | Lee et al. | 705/14.45 |
| 2012/0221411 | A1* | 8/2012 | Graham, Jr. | 705/14.52 |
| 2012/0253943 | A1* | 10/2012 | Chow | G06Q 30/0255 705/14.69 |
| 2012/0324043 | A1* | 12/2012 | Burkard | G06Q 30/0273 709/217 |
| 2013/0006977 | A1* | 1/2013 | Agrawal et al. | 707/728 |
| 2013/0041735 | A1* | 2/2013 | Johnson et al. | 705/14.23 |
| 2013/0046613 | A1* | 2/2013 | Farahat | G06Q 30/00 705/14.43 |
| 2013/0073536 | A1* | 3/2013 | Fedorynski | G06F 17/30887 707/709 |
| 2013/0085859 | A1* | 4/2013 | Sim | G06Q 30/02 705/14.58 |
| 2013/0091019 | A1* | 4/2013 | Mallon et al. | 705/14.68 |
| 2013/0097046 | A1* | 4/2013 | Krishnamurthy et al. | 705/26.3 |
| 2013/0179272 | A1* | 7/2013 | Bonev et al. | 705/14.66 |
| 2013/0204696 | A1* | 8/2013 | Krassner et al. | 705/14.45 |
| 2013/0227440 | A1* | 8/2013 | Chandra et al. | 715/760 |
| 2013/0325591 | A1* | 12/2013 | Delug | G06Q 30/0248 705/14.45 |
| 2013/0332523 | A1* | 12/2013 | Luu | G06Q 30/0251 709/204 |
| 2013/0346400 | A1* | 12/2013 | Ramsey | G06F 17/30864 707/723 |
| 2014/0095329 | A1* | 4/2014 | Liu | G06Q 30/0277 705/14.73 |
| 2014/0109123 | A1* | 4/2014 | Balakrishnan et al. | 725/14 |
| 2014/0188582 | A1* | 7/2014 | Karson | G06Q 30/0263 705/14.6 |
| 2016/0148282 | A1* | 5/2016 | Chan | G06Q 30/02 705/14.73 |
| 2016/0328789 | A1* | 11/2016 | Grosz | G06Q 30/0643 |
| 2017/0091156 | A9* | 3/2017 | Cook | G06F 17/22 |
| 2017/0134778 | A1* | 5/2017 | Christie | H04N 21/2541 |
| 2017/0316443 | A1* | 11/2017 | Goodhart | G06Q 30/0242 |

* cited by examiner

ACTIVE IMPRESSION TRACKING

BACKGROUND

A web-based impression can relate to viewing of a web page by a user, e.g., end-user. Assessment of web-based impressions is an integral part of web analytics—e.g., the discovery and conveyance of web-based information. Such assessment generally includes generation of a metric indicative of an impression associated with a web page. A commonly determined metric is Page View, which is utilized to indicate the event of a page-load and/or to count the number of times a web page has been viewed or otherwise consumed. Such a metric typically is updated in response to the web page being requested and accessed (e.g., loaded) from a host that can serve the content associated with the web page. However, since users typically only load a web page once during a viewing session, metrics such as Page View fail to capture more nuanced user behaviors that can occur after the web page is loaded. Accordingly, there is a need for more sophisticated methods and systems for tracking user engagement with a web page or related interface.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following extensive, more detailed description.

Provided are methods and systems for tracking user, e.g., end-user, engagement with an interface. In one aspect of an exemplary method, interaction of a user with a user interface can be detected. It can be determined that the user interface was updated in response to the interaction. An impression metric indicative of engagement of the user with the user interface can be updated in response to the user interface being updated.

In another aspect, an exemplary system can comprise a device for tracking user, e.g., end-user, engagement. The device can comprise a memory having computer-accessible instructions encoded thereon. The device can also comprise a processor functionally coupled to the memory. The processor can be configured, by the computer-executable instructions, to detect interaction of a user interface with a user interface, determine that the user interface was updated in response to the interaction, and update an impression metric indicative of engagement of the user with the user interface in response to the user interface being updated.

Additional aspects or advantages of the disclosure will be set forth in part in the description which follows, and in part will be apparent from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the subject disclosure:

DETAILED DESCRIPTION

Figure 1:
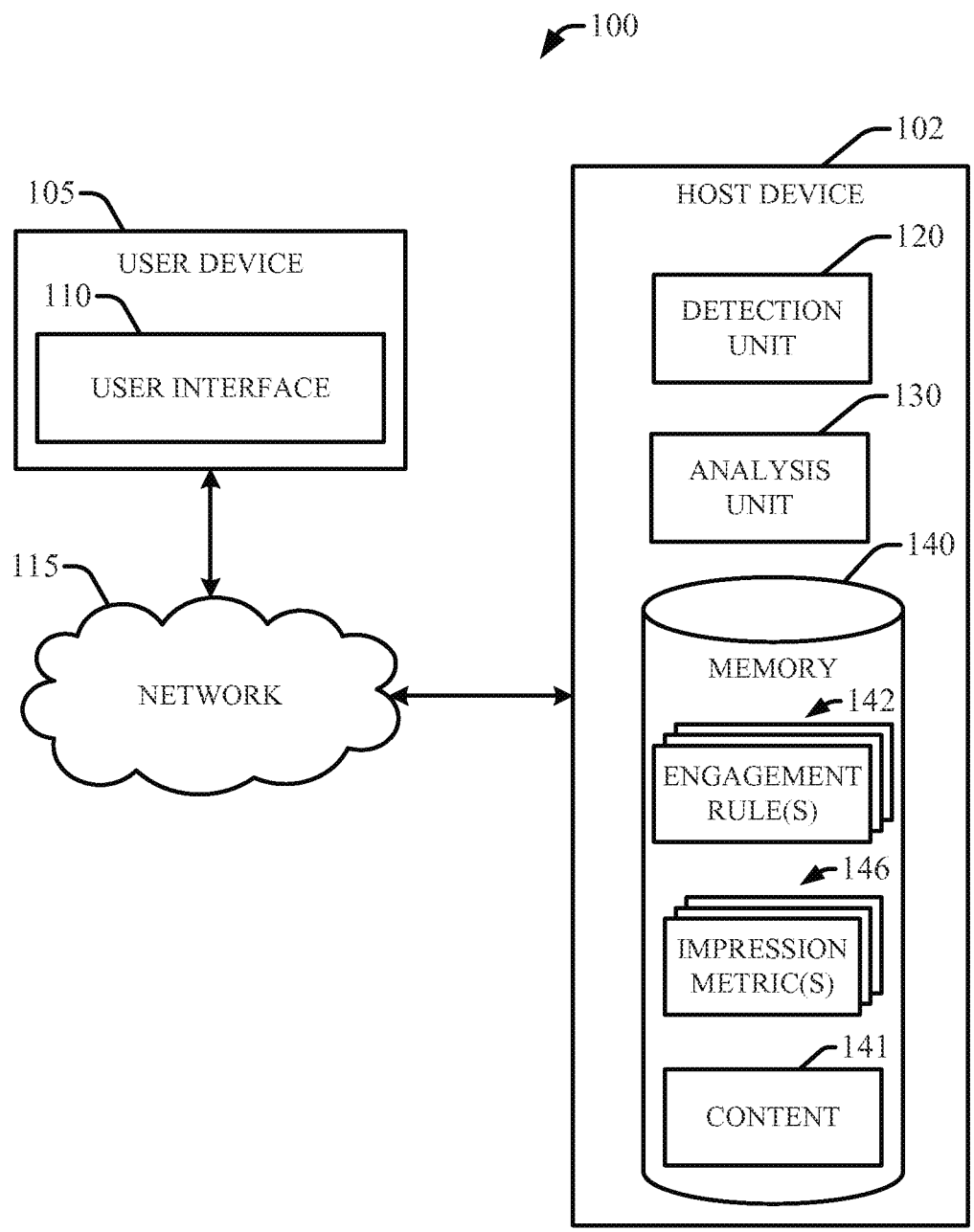
FIG. 1 illustrates an exemplary system in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for tracking user, e.g., end-user, engagement with an interface. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosed engagement tracking technique (e.g., system(s), method(s), combinations thereof, and the like) can permit various tracking applications in an interface (e.g., a web page), such as engagement tracking that is based at least on dynamically-cued, sequential events. Such tracking can permit refinement of events and/or detection thereof based at least on contextual targeting, including but not limited to publishing or promotion of new content, notifications pertinent to the user (e.g., new communications, such as new email or other type of message), and/or serving of advertisements.

When compared to conventional technologies for assessment of user, e.g., end-user, engagement with web-based content, the present disclosure can afford various advantages related to the generation of impression metrics (e.g., engagement metrics). For example, the disclosure can permit updating an impression metric based on client-side interactions of a user with an interface that provides web-based content. In contrast to conventional technologies, in one aspect, such interactions can include a variety of events other than access of content from a host that supplies the web-based content. For another example, the impression metrics of the disclosure are updated more finely than conventional impression metrics, which permits more accurate and/or relevant impression assessment. Because impression metrics can be the currency of online advertising, increased accuracy—quantitative and temporal—of impression assessment can permit better utilization of online advertising resources. Accordingly, the present disclosure can provide enhanced customer usage understanding for better product and business analysis and management. Additionally, further advantages can comprise improved information for web analytics, marketing, product development, operations, strategic planning, and the like.

As described in greater detail below, the disclosure relates to tracking of user, e.g., end-user, engagement with a user interface. Such engagement can be tracked based at least on interaction of the user with the user interface. In one aspect, interaction of the user with a user interface can be detected and, in response to such interaction, it can be determined if the user interface was updated. In scenarios in which it is determined that the user interface was updated, an impression metric can be updated. The impression metric can be indicative of engagement of the user with the user interface and can permit the tracking of user engagement. In one aspect, the user interface permits interaction of a user with a variety of information, such as media content, advertising content, communication content, and the like. The information can comprise dynamic content. In one aspect, a component (e.g., a software component) can be utilized to detect when a user accesses an open instance of an interface, such as a web page, whether in a window or tab, after the initial web page load and page view. The detection can permit updating (e.g., generating, assigning, revising, or the like) an impression metric of the instance of the interface. It should be appreciated that such update can be incremental. It also should be appreciated that conventional impression metrics may not permit recordation and assessment of impressions in such incremental manner. In one aspect, the component (e.g., software component) can utilize a call to pass information back to an analytics platform, such as a web analytics platform data capture tool, to more accurately assess (e.g., measure) user engagement with a user interface and content conveyed via such interface. Such a call can be implemented simultaneously or nearly simultaneously with the detection of the user interaction. Functional elements of the various embodiment(s) described in the present specification and illustrated in the annexed drawings can be employed in operational environments (access network, telecommunication network, signaling network, etc.) that can include, for example, digital equipment, analog equipment, or both, wired or wireless equipment, etc.

Referring to the drawings, FIG. 1 illustrates a high-level block diagram of an exemplary system 100 in accordance with one or more aspects of the disclosure. In one aspect, the exemplary system 100 can comprise a user device 105. The user device 105 can comprise a user interface 110 that can permit a user, e.g., end-user, to interact with information from a content source (e.g., a host server for web-based content or web-based services). For example, the user device 105 can comprise a cell phone, smart phone, tablet device, home computing device, laptop device, television, gaming device, digital media receiver, streaming device, customer premise equipment, and the like. Accordingly, the user device 105 can be a computing device that is communicatively coupled to a network 115 (e.g., a telecommunication network, a home network, a utilities network, or combinations thereof) and has various levels of computational capability. In certain embodiments, the user interface 110 can be instantiated (e.g., executed) to comprise or to be embodied in a web-based interface, such as a web page window or a web browser tab.

In one aspect, the exemplary system 100 can comprise a host device 102. As illustrated, the user interface 110 can be functionally coupled to a host device 102 through the network 115. The host device 102 can provide information (e.g., data, metadata, and/or signaling) to the user interface 110. In one aspect, the network 115 can provide one or more services (such as data exchange service, including broadband internet service, media exchange services, location services, and the like). The network 115 can comprise wireless networks, wireline networks, and any combination thereof. In one aspect, the network 115 can comprise one or more of wide area networks (WANs), one or more local area networks (LANs), signaling networks (e.g., SS #7), and the like. Such networks can operate in accordance with any communication protocol for wireline communication or wireless communication. In certain aspects, the network 115 can comprise several functional elements that can provide a backbone network, such as a high-capacity packet-switched network. In other aspects, the network 115 can comprise an internal network structure, with several functional elements that can provide at least two main operational blocks: a backbone network (e.g., a high-capacity packet-switched network) and a regional access network (RAN). The internal network structure also can comprise functional elements that provide more spatially localized networks, such as local area networks, home area networks, or the like. Both the backbone network and the regional access network (RAN) can comprise WANs, for example, with the backbone network comprising a larger geographical scope than the RAN.

In one aspect, the host device 102 can comprise a detection unit 120. The user interface 110 can be communicatively coupled to the host device 102 through the network 115. Accordingly, the detection unit 120 can acquire (e.g., collect or receive) signaling or other information from the user interface 110. In one aspect, based at least on a portion of such signaling or information, the detection unit 120 can identify an interaction of an user with the user interface 110. The detection unit 120 can monitor interaction with the user interface 110 periodically or according to a predetermined schedule. In certain implementations, to identify such interaction, the detection unit 120 can identify an event indicative of the interaction of the user with the user interface 110. In one aspect, the user interface 110 can comprise a web-based interface. For example, the user interface 110 can comprise and/or be configured to communicate with an end-point interface associated with one or more web services. An interaction and/or update with the end-point interface can be detected as an interaction and/or update to the user interface 110. As a further example, the end-point interface can be a Java based endpoint interface.

Figure 2:
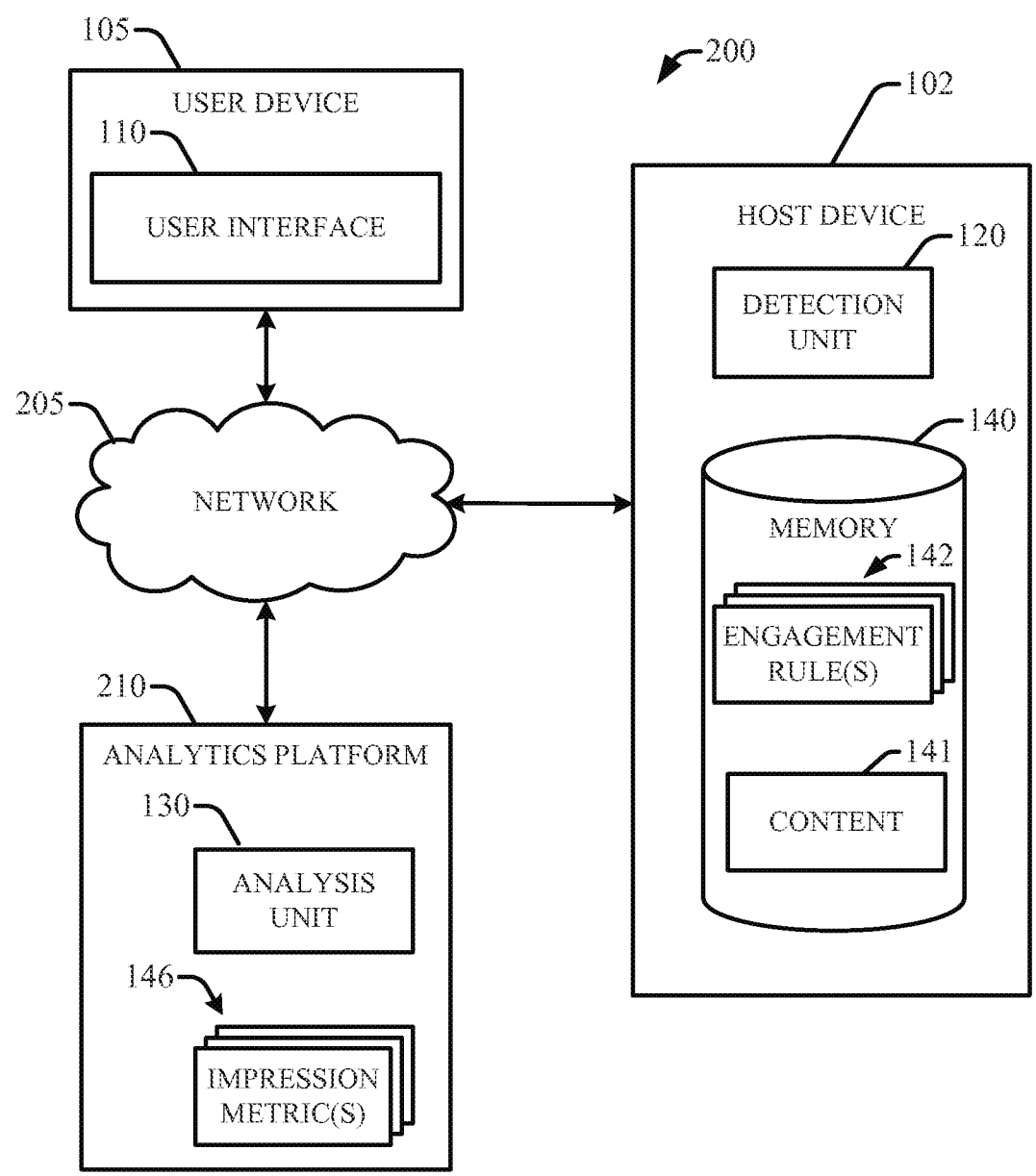
FIG. 2 illustrates another exemplary system in accordance with one or more aspects of the disclosure.

In one aspect, the system 100 can comprise an analysis unit 130. The analysis unit 130 can be implemented at the host device 102 (as shown in FIG. 1) or other location, such as the user device 105, an external computing device, or a third party device (e.g., as shown in FIG. 2). In one implementation, in response to detection of a user, e.g., end-user, interaction with the user interface 110, the analysis unit 130 can determine that content rendered at the user interface 110 was updated or refreshed. In one aspect, the analysis unit 130 can determine that new content was published at user interface 110 in response to the interaction. In another aspect, the analysis unit 130 can determine that new content comprises advertising content at the user interface 110 in response to the detected interaction. For example, content 141 can be provided as updated or refreshed content to the user interface 110. In yet another aspect, the analysis unit 130 can determine that a notification was rendered at the user interface 110 in response to the detected interaction.

In one aspect, the analysis unit 130 can determine that an engagement rule 142 associated with an event identified by the detection unit 120 is satisfied. The engagement rule 142 can be retained (e.g., persisted) in the memory 140 of the host device 102. In one aspect, rules can comprise rules based on opening a page in a new tab or browser window. An exemplary event can occur upon clicking on a universal navigation menu, dashboard menu, and/or search button. The exemplary event can open new content in a new tab or window. When the user returns to the original tab or window, the user interface 110 and/or host device 102 can perform an action. In another aspect, rules can comprise rules based on a content refresh. For example, an event, such as a content refresh, can occur when a page has been open for longer than a specified time (e.g., 15 minutes) and the user reengages with the web page. When this event occurs, the user interface 110 and/or host device 102 can perform an action. Actions that can be triggered by these events (e.g., opening a page in a new tab or browser window, a content refresh) can comprise, for example, refreshing all relevant dynamic content (e.g., email inbox indicator, news, weather, stock ticker) on the web page instantly, serving a new ad(s), tallying an additional impression metric 146, or other relevant action.

In one aspect, the analysis unit 130 can be configured for collection and analysis of web based data, also referred to as web analytics. In response to determining that the user interface 110 was updated or refreshed, the analysis unit 130 can update an impression metric 146 indicative of engagement of the user with the user interface 110. It should be appreciated that by updating the impression metric 146, the example system 100 can track engagement of a user with content supplied (e.g., rendered at an interface). In one aspect, the impression metric 146 can be retained (e.g., persisted) in the memory 140 of the host device 102. In another aspect, the analysis unit 130 can supply one or more impression metrics 146 to a network node functionally coupled to or integrated into the example system 100.

FIG. 2 is a block diagram of another exemplary system 200 for tracking a user, e.g. end-user, engagement with a user interface 110. In one aspect, the exemplary system 200 can comprise some or all of the elements of the system 100 of FIG. 1. Additionally, the exemplary system 200 can comprise an analytics platform 210. One or more impression metrics 146 can be supplied to the analytics platform 210. The analytics platform 210 can be configured to analyze user engagement with the user interface 110 and/or distribute information indicative or representative of such analysis. In one aspect, the analytics platform 210 can aggregate information (e.g., data, metadata, and/or signaling (such as function call or system calls)) indicative of user engagement with the user interface 110 and content therein to provide (e.g., develop a model) more sophisticated impression metrics 146. The aggregated information can be stored as an event history. The event history can be associated with one or more users of the user interface 110. In one aspect, the analytics platform can provide a recommendation based on the aggregated information, such the impression metrics 146. The recommendation can be to provide a type of content, such as an advertisement. The recommendation can be to provide updated content to the user interface more frequently.

In one aspect, the analytics platform 210 can be functionally coupled to or comprise the analysis unit 130. The analytics platform 210 can be functionally coupled to the host device 102 through a network 205. In another aspect, the network 205 can functionally couple the user interface 110 to the analytics platform 210. The network 205 can comprise an upstream link, or uplink (UL), and a downstream link, or downlink (DL). The network 205 can comprise a wireless link or wireline link, or a combination thereof. Additionally, the network 205 can comprise at least part of the network 115 of FIG. 1. In one aspect, the analytics platform 210 can comprise or can be embodied in a content management server (CMS). The CMS can be deployed (e.g., installed, configured) in a network (e.g., network 205) that contains or is functionally coupled to the exemplary system 200.

Figure 3:
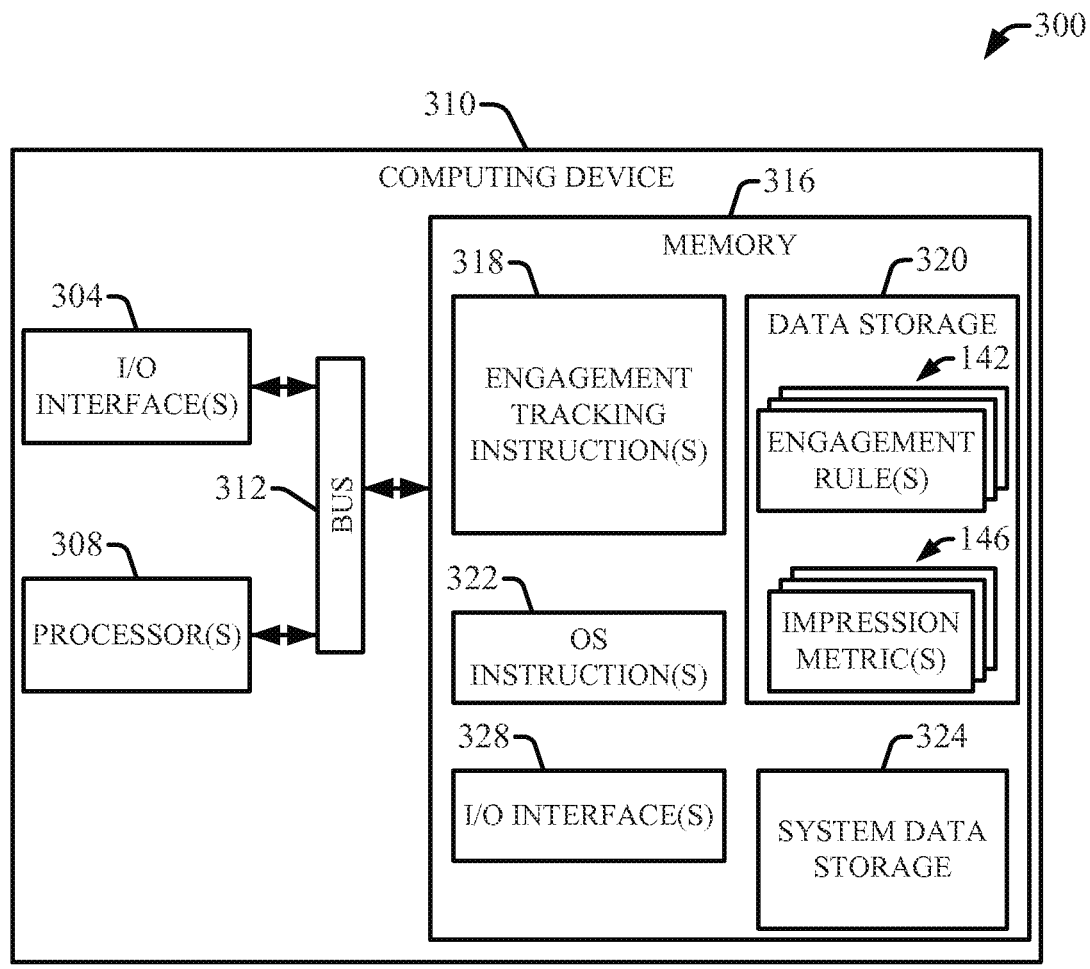
FIG. 3 illustrates an exemplary embodiment of a computing device in accordance with one or more aspects of the disclosure.

FIG. 3 is a block diagram of an example embodiment 300 of a computing device 310 that can implement tracking user, e.g., end-user, engagement with an interface in accordance with one or more aspects of the disclosure. In one aspect, the computing device 310 can embody or can comprise the host device 102 described above. In the illustrated embodiment, the computing device 310 can comprise a memory 316 having computer-accessible instructions, e.g., computer-readable and/or computer-executable instructions, encoded thereon. At least a portion of such instructions can be retained as engagement tracking instruction(s) 318. In addition, the computing device 310 can comprise a processor (e.g., one of processor(s) 308) functionally coupled to the memory 316 and configured by the computer-executable instructions.

As illustrated, in the exemplary embodiment 300, the computing device 310 can comprise a group of one or more I/O interfaces 304, a group of one or more processors 308, a memory 316, and a bus 312 that functionally couples various functional elements of the computing device 310 including the group of one or more processors 308 to the memory 316. In scenarios in which operation of the computing device 310 can be critical to network performance, such as in guaranteed service quality scenarios, the group of one or more processors 308 can comprise a plurality of processors that can exploit concurrent computing.

Functionality of the computing device 310 can be configured by a group of computer-executable instructions (e.g., programming code instructions or programming modules) that can be executed by a processor of the one or more processors 308. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor.

Data and computer-accessible instructions, e.g., computer-readable instructions and computer-executable instructions, associated with specific functionality of the computing device 310 can be retained in memory 316. Such data and instructions can permit implementation, at least in part, of the tracking of user engagement with a user interface in accordance with aspects described herein. In one aspect, the computer-accessible instructions can embody any number of programming code instructions or program modules that permit specific functionality. In the subject specification and annexed drawings, memory elements are illustrated as discrete blocks. However, such memory elements and related computer-accessible instructions, e.g., computer-readable and computer-executable instructions, and data can reside at various times in different storage elements (e.g., registers, files, memory addresses) in memory 316.

Data storage 320 can comprise a variety of data, metadata, or both associated with tracking user engagement in accordance with aspects described herein. For example, data storage 320 can comprise impression metrics 146 and engagement rules 142. Memory 316 also can comprise one or more computer-executable instructions for implementation of specific functionality of the computing device 310 in connection with engagement tracking in accordance with aspects described herein. Such computer-executable instructions can comprise engagement tracking instruction(s) 318. In one aspect, as described herein, the engagement tracking instruction(s) 318 can be stored as an implementation (e.g., a compiled instance) of one or more computer-executable instructions that implement, and thus provide, at least the functionality of the methods described in the disclosure. The engagement tracking instruction(s) 318 also can be transmitted across some form of computer readable media. It should be appreciated that different engagement tracking instruction(s) 318 can render physically alike devices into functionally different components, with functional differences dictated by logic (e.g., computer-executable instructions and data) specific to each one of such network nodes and defined by the engagement tracking instruction(s) 318.

Memory 316 can be embodied in a variety of computer-readable media. Exemplary computer-readable media can be any available media that is accessible by a processor in a computing device, such as one processor of the group of one or more processors 308, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium that can be utilized to store the desired information and can be accessed by a computer or a processor therein or functionally coupled thereto.

Memory 316 can comprise computer-readable non-transitory storage media in the form of volatile memory, such as RAM, EEPROM, and the like, or non-volatile memory such as ROM. In one aspect, memory 316 can be partitioned into a system memory (not shown) that can contain data and/or programming modules that enable essential operation and control of the computing device 310. Such program modules can be implemented (e.g., compiled and stored) as OS instruction(s) 322, whereas such data can be system data that is retained in system data storage 324. The OS instruction(s) 322 and system data storage 324 can be immediately accessible to and/or are presently operated on by at least one processor of the group of one or more processors 308. The OS instruction(s) 322 can embody an operating system for the computing device 310. Specific implementation of such OS can depend in part on the architectural complexity of the computing device 310. Higher complexity affords higher-level OSs. Example operating systems can comprise Unix, Linux, iOS, Windows operating system, and substantially any operating system for a computing device.

Memory 316 can comprise other removable/non-removable, volatile/non-volatile computer-readable non-transitory storage media. As an example, memory 316 can comprise a mass storage unit (not shown) that can provide non-volatile storage of computer code, computer readable instructions, data structures, program modules, and other data for the computing device 310. A specific implementation of such mass storage unit (not shown) can depend on the desired form factor of and space available for deployment of the computing device 310. For suitable form factors and sizes of the monitoring device, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memory (RAM), read only memory (ROM), electrically erasable programmable read-only memory (EEPROM), or the like.

Features of tracking user engagement with a user interface in accordance with aspects described herein can be performed, at least in part, in response to execution of software components (e.g., one or more implementations of engagement tracking instruction(s) 318) by a processor. In particular, yet not exclusively, to provide the specific functionality of the computing device 310, a processor of the group of one or more processors 308 can execute at least a portion of the engagement tracking instruction(s) 318. As illustrated, the processor can be functionally coupled to the memory and configured, by the computer-executable instructions, to detect interaction of a user with an user interface, determine that the user interface was updated in response to the interaction, and update an impression metric indicative of engagement of the user with the user interface in response to the user interface being updated. In one aspect, the processor can be further configured to supply the impression metric to an analytics platform configured to analyze user engagement with the user interface. In another aspect, the processor can be further configured to detect an event indicative of the interaction of the user with the user interface. In one aspect, the user interface is a web-based interface. In yet another aspect, the processor can be further configured to determine that content rendered at the user interface was updated in response to the interaction. In still another aspect, the processor can be further configured to determine that new content was published at the user interface in response to the interaction. In another aspect, the processor can be further configured to determine that new content was advertised at the user interface in response to the interaction. In another aspect, the processor can be further configured to determine that a notification was rendered at the user interface in response to the interaction. In yet another aspect, the processor can be further configured to determine that a rule (e.g., one of the engagement rules 142 described above) associated with the event is satisfied.

In general, a processor of the group of one or more processors 308 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 308 can refer to an integrated circuit with dedicated functionality, such as an ASIC, a DSP, a FPGA, a CPLD, a discrete gate or transistor logic, discrete hardware components, or any combination thereof designed to perform the functions described herein. In one aspect, processors referred to herein can exploit nano-scale architectures, such as molecular and quantum-dot based transistors or switches and gates, in order to optimize space usage (e.g., improve form factor) or enhance performance of the computing devices that can implement the various aspects of the disclosure. In another aspect, the one or more processors 308 can be implemented as a combination of computing processing units.

The one or more input/output (I/O) interfaces 304 can functionally couple (e.g., communicatively couple) device 310 to another functional element (component, unit, server, gateway node, repository, etc.) of a network, for example. Functionality of the device 310 that is associated with data I/O or signaling I/O can be accomplished in response to execution, by a processor of the group of one or more processors 308, of at least one I/O interface 328. In some embodiments, the at least one I/O interface embodies an API that can permit exchange of data or signaling, or both, via an I/O interface of I/O interface(s) 304. In certain embodiments, the one or more I/O interfaces 304 can comprise at least one port that can permit connection of the computing device 310 to other functional elements of an exemplary network environment. In one or more scenarios, the at least one port can comprise one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 304 can enable delivery of output (e.g., output data, output signaling) to such functional element. Such output can represent an outcome or a specific action of one or more actions described herein, such as action(s) in exemplary methods of FIG. 4 and/or FIG. 5.

Bus 312 can comprise one or more of several types of bus structures, including a memory bus or memory controller, a peripheral bus, an accelerated graphics port, and a processor or local bus using any of a variety of bus architectures. As an example, such architectures can comprise an ISA bus, an MCA bus, an EISA bus, a VESA local bus, an AGP bus, and a PCI, a PCI-Express bus, a PCMCIA bus, a USB bus, or the like.

Figure 4:
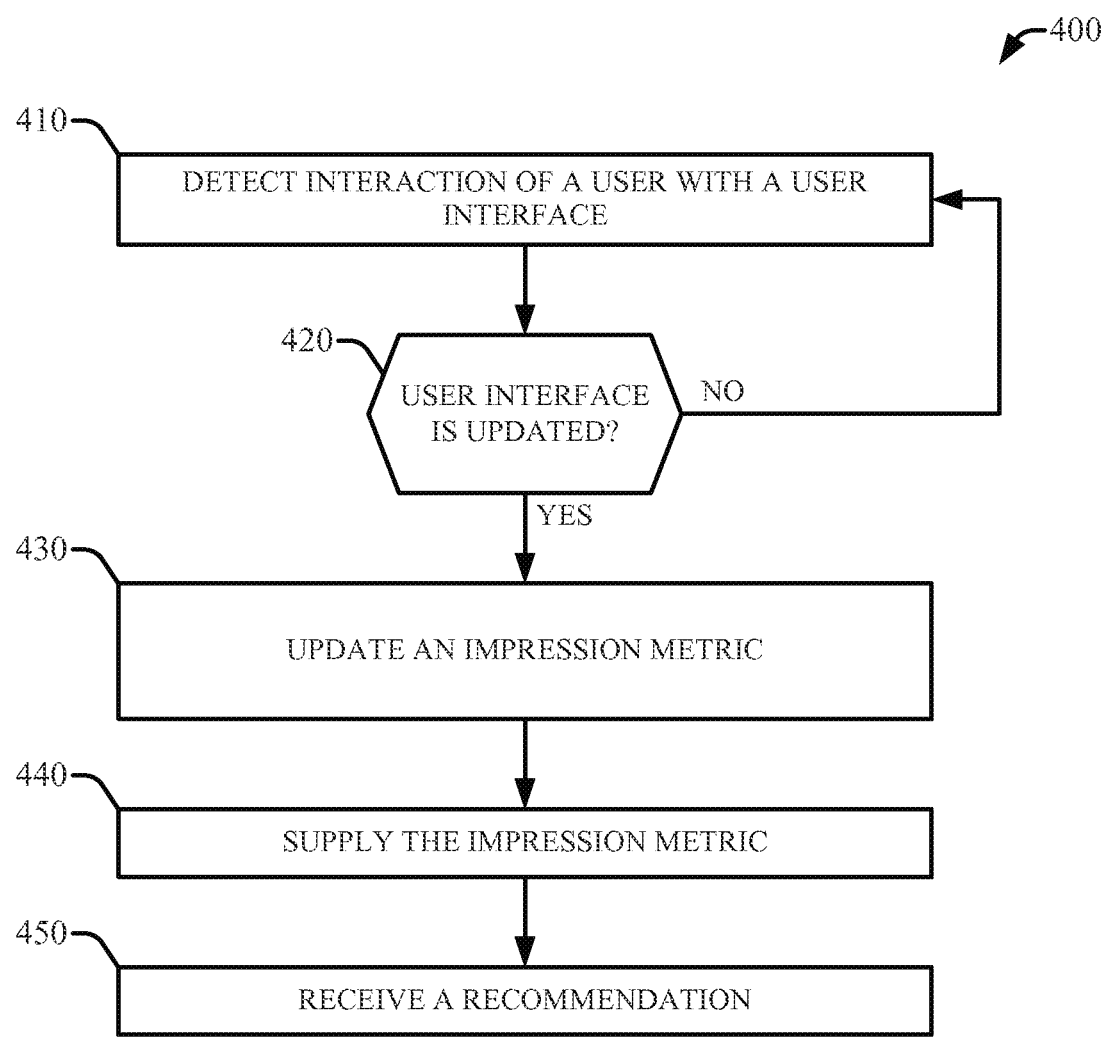
FIG. 4 illustrates an exemplary method in accordance with one or more aspects of the disclosure.
Figure 5:
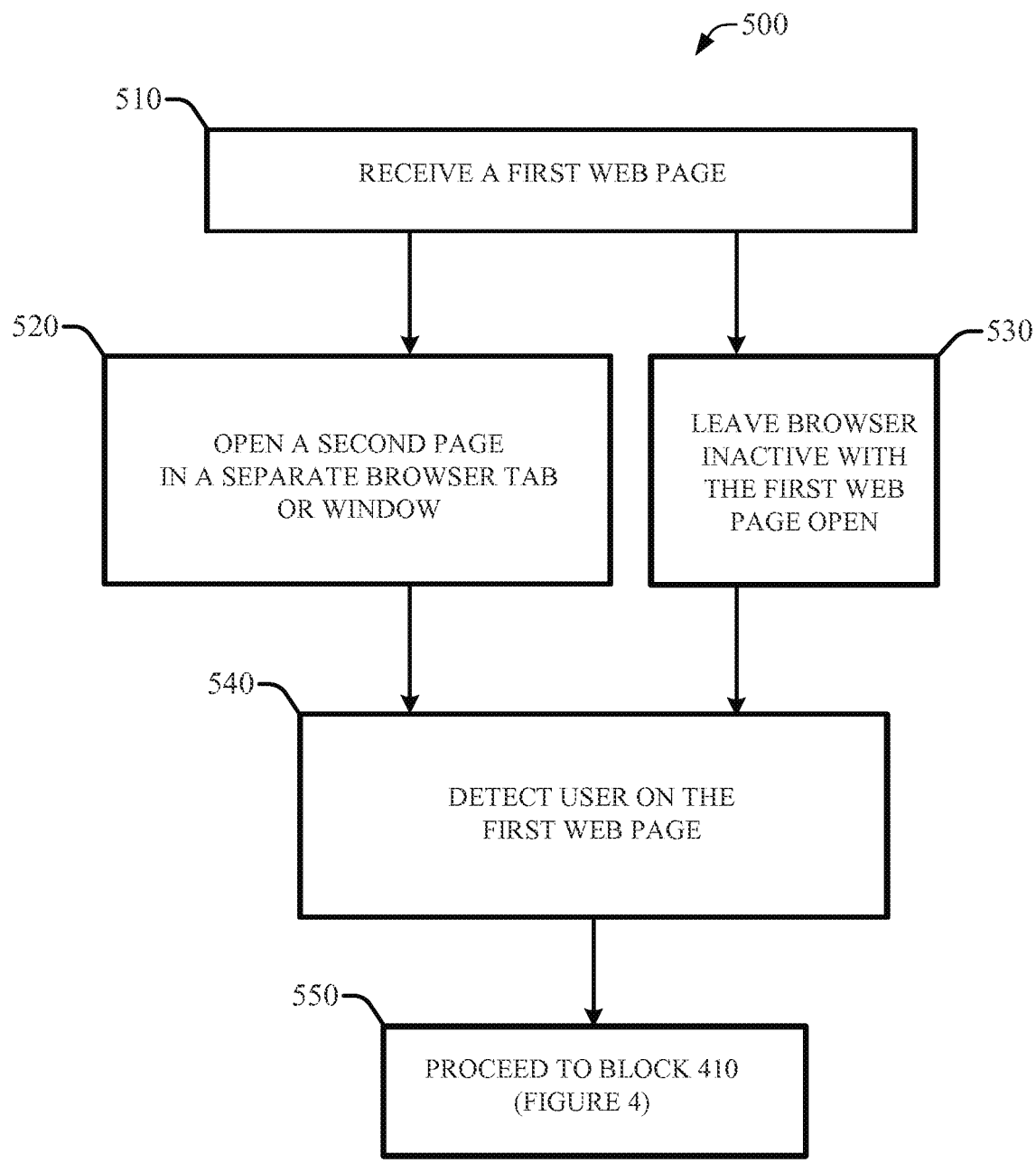
FIG. 5 illustrates an exemplary method for refreshing information associated with a user interface according to one or more aspects of the disclosure.

In view of the various aspects of tracking user, e.g., end-user, engagement with a user interface, such as those described herein, exemplary methods that can be implemented in accordance with the disclosure can be better appreciated with reference to the flowcharts in FIGS. 4-5. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram. Moreover, when disparate functional elements (network nodes, units, etc.) implement disparate portions of the methods of the subject disclosure, an interaction diagram or a call flow can represent such methods or processes. Furthermore, not all illustrated actions or messages may be required to implement a method in accordance with the subject disclosure.

The methods disclosed throughout the subject specification can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 4 is a flowchart of an exemplary method 400 for tracking user, e.g., end-user, engagement with an interface according to one or more aspects of the disclosure. One or more blocks of the example method 400 can be implemented (e.g., performed or executed) by a computing device, such as the computing device 310, or a processor integrated into the computing device or functionally coupled thereto.

At block 410, interaction of an user with a user interface can be detected. In one aspect, block 410 can be referred to as the detecting action and can comprise detecting an event indicative of the interaction of the user with the user interface. In one aspect, the user interface is a web-based interface. At block 420, it can be determined if the user interface was updated. In one aspect, an update of the user interface can comprise a content refresh (e.g., information that is not advertisement) or a signaling refresh (e.g., a function call update, such as an omniture call, pixel-tracking javascript call, or other user-executed request for the purposes of passing web analytics data). For example, a user interface can be updated when the user scrolls up or down, minimizes the user interface, maximizes the size of the user interface, switches to a web page by click on a tab, and the like.

In a scenario in which it is determined that the user interface was not updated, flow can be directed to block 410. In the alternative, in response to determining that the user interface was updated, flow can be directed to block 430, at which an impression metric can be updated. For example, updating the impression metric can comprise updating a tally of interactions of the user with the user interface. For example, a count can be incremented. The count can indicate, for example, the number or times a user has interacted with the user interface. Additionally, the count can indicate the frequency of interactions of the user with the user interface. In another aspect, updating the impression metric can comprise updating an event history associated with the user. For example, a history of function calls, updates to content, or other interactions can be updated. In one aspect, the impression metric can be indicative of engagement of the user with the user interface. Determining that user interface was updated can comprise determining that content rendered at the user interface was updated in response to the interaction. In one scenario, determining that content rendered at the user interface was updated can comprise determining that new content was published at the user interface in response to the interaction. In another scenario, determining that content rendered at the user interface was updated can comprise determining that new content was advertised at the user interface in response to the interaction. In yet another scenario, determining that content rendered at the user interface was updated can comprise determining that a notification (e.g., aural indicia, visual indicia, or a combination thereof) was rendered at the user interface in response to the interaction.

In certain embodiments, determining that the user interface was updated can comprise determining that a rule associated with the event is satisfied. For example, the user interface can be updated when one of the rules in the one or more memory elements described above is satisfied.

In certain embodiments, one or more of the blocks 410, 420, and 430 can be implemented simultaneously or nearly simultaneously. As described herein, in certain embodiments, such blocks can be implemented as computer-accessible instructions, which can be executed concurrently or nearly concurrently.

At block 440, the impression metric can be supplied. As described herein, the impression metric can be supplied to an analytics platform (e.g., analytics platform 210) configured to analyze user engagement with the user interface and/or distribute information indicative or representative of such analysis. As described herein, the analytics platform 210 can comprise or can be embodied in a CMS.

At block 450, a recommendation can be received. For example, the recommendation can be received from the analytics platform. The recommendation can be based on the impression metric. For example, the recommendation can comprise specific content or type of content, such as an advertisement. The recommendation can comprise a suggestion to provide the content or type of content to a user, for example, at the user interface. The recommendation can be to provide updated content to the user interface more frequently.

FIG. 5 is a flowchart of an exemplary method 500 for refreshing information associated with a user interface according to one or more aspects of the disclosure. One or more blocks of the example method 500 can be implemented (e.g., performed or executed) by the computing device that can perform the example method 400. In addition or in the alternative, a processor of the computing device, or a processor functionally coupled thereto, can implement (e.g., perform or execute) one or more blocks of the exemplary method 500. At block 510, a first web page can be received and loaded. In one aspect, the first web page can comprise content, advertisements, menus, functional components, and the like.

At block 520, a user, e.g., end-user, can receive and/or load a second web page. For example, the second web page can be received and/or loaded in to a separate browser window or browser tab. For example, certain components of the first web page can trigger a new tab or browser window to open when the component is clicked on by the user. As a further example, a new browser tab or browser window can open automatically as the result of the execution of a script. Alternatively, a user can click on a link to the second web page. The link can have an embedded instruction to open the second web page in a new browser window or browser tab. As another example, the user can instruct the browser to open up the second web page in a new browser window or browser tab. In one aspect, when the second web page is opened, the first web page can remain inactive.

Alternatively, at block 530, a user can leave a browser inactive with the first web page open. For example, the user can open another software application, such as a word processor, image viewer, or other software external to the browser. While the user has the other software application open, the browser can remain inactive. In one aspect, the browser can be minimized or otherwise hidden from view while the browser is inactive. In another aspect, the user can leave or otherwise cease interacting with the computing device running the browser. For example, the user can leave the computing device to answer the phone, talk with someone, or leave for any reason. In another aspect, the user can remain near the computing device without interacting with the computing device.

At block 540, a user can be detected on the first web page. For, example, the user can be detected at the first web page at or after a minimum predetermined time elapses. In one aspect, the web page can be inspected at time intervals determined by the predetermined time. The predetermined time can be any arbitrary time. In one aspect, the predetermined time can be a time configured to distinguish between time spent away from the first web page rather than time spent on the webpage without interacting with the web page. For example, the predetermined time can be longer than the time it takes for an average user to read the web page before further navigating or interacting with the web page.

In one aspect, the user can be detected on the first web page if content on the first web page has been updated or otherwise interacted with since a previous time of inspection. In one aspect, an interaction can be detected if content on the web page has changed or new content has been added to the web page. The content on the web page can change, for example, through a function call of a script language (e.g., XMLHttpRequest). The content can change without reloading or refreshing the entire web page. For example, a portion of a web page can be updated, such as an advertisement, news ticker, message, graphic and the like. The script language can comprise computer code embedded in the web page. The function call can be triggered by a variety of events, such as moving the mouse over a web page element, clicking a button, inputting text into a text box, pressing a key on the keyboard, scrolling the web page up or down, adjusting the size of the web browser window, and the like.

At block 540, the method can proceed to block 410 of FIG. 4.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   detecting, by at least one computing device, that a first user interface for rendering first content has been loaded by a user device at a first time;
   detecting, by the at least one computing device, that a second user interface for rendering second content has been loaded by the user device at a second time, wherein the second time is after the first time;
   detecting, by the at least one computing device, an interaction of a user with the first user interface after the second user interface has loaded;
   determining, by the at least one computing device, that the first content rendered at the first user interface that was loaded at the first time was updated by the user device in response to the interaction, wherein at least a portion of the first content remains loaded in the first user interface after being updated; and
   updating, by the at least one computing device, based on determining that the first content rendered at the first user interface was updated, an incremental impression metric indicative of engagement of the user with the first user interface.

2. The method of claim 1, further comprising supplying the incremental impression metric to an analytics platform configured to analyze user engagement with the first user interface.

3. The method of claim 1, wherein the first user interface is a web-based interface.

4. The method of claim 1, wherein determining that the first content rendered at the first user interface was updated comprises determining that new content was published at the first user interface in response to the interaction.

5. The method of claim 1, wherein determining that the first content rendered at the first user interface was updated comprises determining that new content was advertised at the first user interface in response to the interaction.

6. The method of claim 1, wherein determining that the first content rendered at the first user interface was updated comprises determining that a notification was rendered at the first user interface in response to the interaction.

7. A method, comprising:
   receiving a first web page;
   rendering the first web page in a first user interface;
   updating, based on receiving the first web page, an impression metric, wherein the impression metric comprises a tally indicative of consumption of the first web page by a user after the first web page is received;
   receiving a second web page;
   rendering the second web page in a second user interface;
   detecting an interaction of the user with the first web page after receiving the second web page;
   determining an update occurred to the first web page in response to the interaction, wherein at least a portion of the first web page remains loaded in the first user interface after the update; and
   updating, based on determining the update occurred to the first web page, the impression metric.

8. The method of claim 7, wherein detecting the interaction of the user with the first web page comprises detecting a function call indicative of the interaction of the user with the first web page.

9. The method of claim 7, wherein detecting the interaction of a user with the first web page comprises detecting interaction of the user with the first web page after a minimum predetermined time has elapsed.

10. The method of claim 7, further comprising supplying the impression metric to an analytics platform, wherein the analytics platform is configured to analyze user engagement with the first web page.

11. An apparatus, comprising:
   one or more processors; and
   a memory storing processor executable instructions that, when executed by the one or more processors, cause the apparatus to:
      detect that a first user interface for rendering first content has been loaded by a user device at a first time;
      detect that a second user interface for rendering second content has been loaded by the user device at a second time, wherein the second time is after the first time;

detect an interaction of a user with the first user interface after the second user interface has loaded;

determine that the first content rendered at the first user interface that was loaded at the first time was updated by the user device in response to the interaction, wherein at least a portion of the first content remains loaded in the first user interface after being updated; and update, based on determining that that the first content rendered at the first user interface was updated, an incremental impression metric indicative of engagement of the user with the first user interface.

12. The apparatus of claim 11, wherein the first user interface is a web-based interface.

13. The apparatus of claim 11, wherein the processor executable instructions that, when executed by the one or more processors, cause the apparatus to update the incremental impression metric comprises processor executable instructions that, when executed by the one or more processors, cause the apparatus to update an event history associated with the user.

14. The apparatus of claim 11, wherein the processor executable instructions, when executed by the one or more processors, further cause the apparatus to receive a recommendation from an analytics platform, wherein the recommendation comprises suggested content to be provided at the first user interface based on the incremental impression metric.

15. The method of claim 1, further comprising determining, based on the incremental impression metric, a fee for content presented at the first user interface.

16. The method of claim 7, further comprising determining, based on the incremental impression metric, a fee for content presented at the first web page.

17. The apparatus of claim 11, wherein the processor executable instructions, when executed by the one or more processors, further cause the apparatus to determine, based on the incremental impression metric, a fee for content presented at the first user interface.

18. The method of claim 3, wherein the web-based interface is a web page window.

19. The method of claim 3, wherein the web-based interface is a web browser tab.

20. The apparatus of claim 11, wherein the processor executable instructions, when executed by the one or more processors, further cause the apparatus to supply the incremental impression metric to an analytics platform, wherein the analytics platform is configured to analyze user engagement with the first user interface.

* * * * *